United States Patent [19]

Shimp et al.

[11] 4,246,148

[45] Jan. 20, 1981

[54] TWO COMPONENT AQUEOUS COATING COMPOSITION BASED ON AN EPOXY-POLYAMINE ADDUCT AND A POLYEPOXIDE

[75] Inventors: David A. Shimp, Prospect; Darrell D. Hicks, Jeffersontown; Richard B. Graver, Louisville, all of Ky.

[73] Assignee: Celanese Corporation, New York, N.Y.

[21] Appl. No.: 70,194

[22] Filed: Aug. 27, 1979

[51] Int. Cl.$^3$ .............................................. C08L 63/02
[52] U.S. Cl. .................... 260/18 EP; 260/29.2 EP; 260/33.2 EP; 260/33.4 EP; 260/37 EP; 428/413; 428/418; 525/526; 525/939
[58] Field of Search ............... 260/29.2 EP, 33.2 EP, 260/33.4 EP, 18 EP; 525/526, 939; 528/421

[56] References Cited

U.S. PATENT DOCUMENTS

| | | | |
|---|---|---|---|
| 2,643,239 | 6/1953 | Shokal et al. | 260/42 |
| 2,651,589 | 9/1953 | Shokal et al. | 154/140 |
| 2,909,448 | 10/1959 | Schroeder | 260/29.2 EP |
| 2,938,004 | 5/1960 | Dehoff | 260/33.8 EP |
| 3,336,253 | 8/1967 | Wong et al. | 260/29.2 |
| 3,449,281 | 6/1969 | Sullivan et al. | 260/29.2 |
| 3,639,344 | 2/1972 | Kinneman et al. | 525/526 |
| 3,719,626 | 3/1973 | May | 260/29.2 EP |
| 3,993,707 | 11/1976 | Cummings | 525/526 |
| 4,064,090 | 12/1977 | Gibson | 260/29.4 R |
| 4,089,826 | 5/1978 | Moss et al. | 260/29.2 EP |
| 4,093,594 | 6/1978 | Anderson | 260/29.2 EP |
| 4,116,900 | 9/1978 | Aelanger | 260/18 EP |
| 4,134,864 | 1/1978 | Belanger | 260/18 EP |
| 4,137,140 | 1/1979 | Belanger | 208/181 C |
| 4,139,510 | 2/1979 | Anderson | 260/18 N |

FOREIGN PATENT DOCUMENTS

| | | | |
|---|---|---|---|
| 884929 | 11/1971 | Canada | 260/29.2 EP |
| 2549656 | 5/1976 | Fed. Rep. of Germany . | |
| 1122810 | 8/1968 | United Kingdom | 260/29.2 EP |
| 1131543 | 10/1968 | United Kingdom | 260/29.2 EP |
| 1242783 | 8/1971 | United Kingdom | 260/29.2 EP |
| 1326435 | 8/1973 | United Kingdom | 260/29.2 EP |

*Primary Examiner*—Theodore E. Pertilla
*Attorney, Agent, or Firm*—T. J. Morgan; K. A. Genoni; Herbert P. Price

[57] ABSTRACT

The present invention is directed to a two component industrial maintenance coating. The first component is a polyamine terminated epoxy resin which is end capped with a monoepoxide. The second component is a low molecular weight polyepoxide crosslinker. When salted with an acid, the adduct can be dissolved or dispersed in water. The polyepoxide crosslinker can then be microemulsified in the system. When coated on a substrate, the two component mixture cures at room temperature producing coatings having excellent balance of chemical and physical properties.

13 Claims, No Drawings

TWO COMPONENT AQUEOUS COATING COMPOSITION BASED ON AN EPOXY-POLYAMINE ADDUCT AND A POLYEPOXIDE

BACKGROUND OF THE INVENTION

The field to which this invention pertains is curable compositions based on mixtures of polyepoxide-amine adducts and epoxy resins, particularly aqueous compositions wherein the epoxy resin is microemulsified in an aqueous solution of an acid salt of the polyepoxide-amine adduct.

Industrial maintenance coatings are used as protective coatings for a variety of substrates which are exposed to harsh environmental or use conditions. Such coatings should exhibit chemical and stain resistant properties, gloss and hardness, as well as good adhesion to the substrates to which they are applied. Improved adhesion is attained when the coatings are capable of wetting a substrate to which they are applied. Such coatings must provide a sealing film over a variety of substrates such as metals, wood, wall board, concrete, and various masonry surfaces. Moreover, such coatings must be capable of being cured at normal ambient temperatures since it is not always convenient to subject the coated substrate to elevated temperatures.

Due to increasing problems with air pollution, considerable efforts are being expended to convert organic solvent containing coating compositions to water based systems, i.e., coating systems based on solutions, dispersions and emulsions of film forming resins in water. One of the problems in the use of aqueous systems is the inability of the resin to properly wet the substrate and to form a continuous coating. Another problem is the low water and solvent resistance of the coatings which are cured at ambient temperatures. Still other problems are the mechanical stability, e.g., particle settling, freeze-thaw stability and shear sensitivity, and chemical stability, e.g., pot-life, of aqueous coating systems.

The mechanical stability, e.g., particle settling, freeze thaw stability, shear sensitivity, and chemical stability, e.g., pot-life and sag resistance as a function of pot life, of aqueous coating systems as well as the chemical and physical properties of an applied coating derived therefrom, such as cure time and temperature, gloss, blush resistance, and wet adhesion, etc., will vary not only with the identity of the polymers present therein but also with the particular physical arrangement of distribution of these polymers in the aqueous media. For example, generally, the smaller the particle size of the film forming components of a paint composition the better will be the coalescence of these particles upon drying and the better will be the continuity and gloss of the resulting film. However, if the particle size is too small, the components can be excessively reactive and can also require substantial amounts of water to attain application viscosity, thereby lowering the solids content of the system. Consequently, it is desirable to formulate a particular coating system wherein the polymers present therein possess a small particle size which is tailored to the needs of the system. When the film forming components are soluble in water, pot life is excessively short and particle size is not adjustable. However, when one or more of the film forming components are insoluble in water, particle size becomes a factor to be controlled.

One approach to water based systems involves emulsification of the resins, e.g., epoxy resins, themselves. However, when such emulsions or dispersions are combined with curing agents, e.g., polyamide-amines, or carbonate forming polyamines, incompatability can result upon coalescence which can be manifested by undesirable loss of film gloss and by permeability to water and aggressive chemicals.

Moreover, when excessive amounts of emulsifying agents are employed to achieve a suitable reduction in the particle size of the film forming components, the water resistance and hardness of the resulting film is reduced.

The search has continued for an aqueous based coating composition which can be employed as an industrial maintenance coating and which, when applied as a film, exhibits certain desirable characteristics. The present invention is a result of this search.

It is an object of the present invention to provide a relatively solvent free coating system which meets current air pollution regulations.

It is a further object of the present invention to provide a coating system which is capable of exhibiting a commercially acceptable pot life, improved wetting properties, and compatability of the components present therein, and will cure at normal ambient temperatures.

It is still another object of the present invention to provide a coating system which is capable of forming films having improved gloss, water resistance, alkali resistance, solvent resistance, flash rusting resistance, good adhesion properties, early tack free time, and good overnight hardness.

These and other objects and features of the invention will become apparent from the claims and from the following description.

SUMMARY OF THE INVENTION

In one aspect of the present invention there is provided a two component resin coating system which when the components are mixed forms a curable composition. The first component is the reaction product of a polyepoxide resin and a polyamine to form a polyamine terminated epoxy adduct which is then reacted with an end capping agent. The polyepoxide resin is represented by the structural formula:

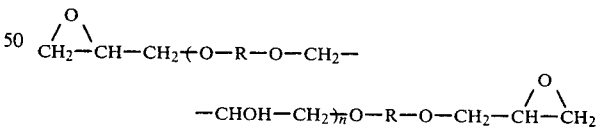

wherein R is a divalent hydrocarbon radical of a dihydric phenol and the average value of n is not greater than about 5.

The polyamine has at least two amine nitrogen atoms per molecule, at least three reactive amine hydrogen atoms per molecule and no other groups reactive with epoxide groups.

The end capping agent is a monoepoxide or mixtures of monoepoxides wherein each monoepoxide has between about 9 and about 16 carbon atoms, one 1,2-epoxide group per molecule and no other groups reactive with amine groups. However, at least 25 mole percent of the monoepoxide consistuting the end capping agent is at least one aliphatic monoepoxide, and at least a portion of the end capping agent additionally is a crosslinker-compatabilizing-amount of at least one aromatic monoepoxide when the average value of n of the polyepoxide resin is not greater than about 2. About 1 mole of the polyamine is reacted per each epoxide equivalent of the polyepoxide resin and the end capping agent is reacted with the polyamine terminated epoxy adduct in an amount sufficient to eliminate the presence of primary amines on said adduct end. This amount of end capping agent is sufficient to achieve at least a molar ratio of end capping agent to epoxy adduct of 2:1 respectively and not greater than the amount which would lead to a reduction in the amine hydrogen functionality of each molecule of the end capped polyamine terminated epoxy adduct to below about 3.

The first component optionally contains at least one non-reactive organic aliphatic hydroxyl containing co-solvent having a solubility parameter polar component between about 2.8 and about 4.5 $(cal/cm^3)^{\frac{1}{2}}$ present in an amount of not greater than about 45%, by weight, based on the weight of said end capped adduct and co-solvent.

The second component is a polyepoxide resin crosslinker which is a glycidyl polyether of a polyhydric phenol having an epoxide equivalent weight of about 150 to about 600. The amount of the crosslinker in the second component is sufficient to achieve an epoxy to reactive end capped adduct amine hydrogen equivalent weight ratio of from about 0.5:1 to about 1.5:1.

The second component optionally contains a diluent in admixture with the polyepoxide resin crosslinker. The diluent can be co-solvents, monoepoxides, aliphatic polyglycidyl ethers having from about 10 to about 50 carbon atoms and water-nonionic surfactant mixtures.

More specifically, the co-solvent diluent can be at least one non-reactive organic aliphatic hydroxyl containing co-solvent having a solubility parameter polar component between 2.8 and 4.5 $(cal/cm^3)^{\frac{1}{2}}$. The co-solvent diluent when employed is present in the second component in an amount not greater than about 40%, by weight, based on the weight of diluent and crosslinker.

The monoepoxide diluent can be at least one monoepoxide having (a) one 1,2-epoxide group and no other groups reactive with amine groups; (b) between about 9 and about 16 carbon atoms; and (c) the capability of dissolving the polyepoxide resin crosslinker therein at room temperature.

The monoepoxide and aliphatic polyglycidyl ether diluents when employed, are present in the second component in an amount not greater than about 40%, by weight, based on the weight of crosslinker and diluent.

Alternatively, the diluent can be a mixture of water and a nonionic surfactant capable of dispersing the polyepoxide resin crosslinker. The water-surfactant mixture is present in the second component in an amount not greater than about 75%, by weight, based on the weight of the diluent and crosslinker and the surfactant itself is present in the second component in an amount of from about 3 to about 12%, by weight, based on the weight of surfactant and crosslinker.

The first and second components are suitable for mixing when the amine groups of the end capped polyamine terminated epoxy adduct are salted to a degree of from about 15 to about 85% by reaction with a volatile acid, and the first component is diluted with water in an amount sufficient to achieve a solids content therein of from about 15 to about 45%, by weight, based on the weight of the end capped polyamine terminated epoxy adduct, co-solvent when present, and water.

Upon mixing the first and second components, the crosslinker is dispersed, in the microemulsified state, into the first component. The solids content of the resulting mixture is adjusted by dilution with water to from about 20 to about 50%, by weight, based on the weight of the total composition, prior to application of the coating composition to a substrate.

A further aspect of the present invention provides a curable coating composition which comprises the mixture of the above described two components wherein the end capped polyamine terminated epoxy adduct is present in its salt form as described above.

DESCRIPTION OF THE PREFERRED EMBODIMENTS

First Component

The monoepoxide end capped polyamine terminated epoxy adduct of the first component is the reaction product of a polyamine with a polyepoxide resin which forms an epoxy-amine adduct which is then further reacted with monoepoxide end capping agent.

The polyamines which are reacted with the polyepoxide resins to form the epoxy-amine adduct contain at least 2 amine nitrogen atoms per molecule, at least 3 amine hydrogen atoms per molecule, and no other groups which are reactive with epoxide groups. These polyamines can be aliphatic, or cycloaliphatic and contain at least 2 carbon atoms per molecule. Useful polyamines contain about 2 to about 6 amine nitrogen atoms per molecule, 3 to about 8 amine hydrogen atoms, and 2 to about 20 carbon atoms. Examples of such amines are the alkylene polyamines, ethylene diamine, 1,2-propylene diamine, 1,3-propylene diamine, 1,2-butylene diamine, 1,3-butylene diamine, 1,4-butylene diamine, 1,5-pentalene diamine, 1,6-hexylene diamine, methane diamine, 1,4-diaminocyclohexane and the like. Preferred amines for use in this invention are alkylene polyamines of the formula:

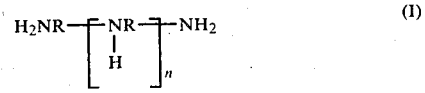   (I)

wherein n is an integer of 0 to 4 and R is an an alkylene group containing 2 to 6 carbon atoms. Examples of such alkylene polyamines are ethylene diamine, diethylene triamine, triethylene tetramine, tetraethylene pentamine, pentaethylene hexamine, dipropylene triamine, tributylene tetramine, hexamethylene diamine, dihexamethylene triamine and the like. Mixtures of amines can also be used. The more preferred amines are the ethylene polyamines with the most preferred being triethylene tetramine and diethylene triamine.

The polyepoxide resins useful in preparing the epoxy-amine adduct include glycidyl polyethers of polyhydric phenols and contain more than one 1,2-epoxide group per molecule. Such polyepoxide resins are derived from an epihalohydrin and a dihydric phenol. Examples of epihalohydrins are epichlorohydrin, epibromohydrin and epiiodohydrin with epichlorohydrin being preferred. Dihydric phenols are exemplified by resorcinol, hydroquinone, p,p'-dihydroxydiphenylpropane (or Bisphenol A as it is commonly called), p,p'-dihydroxybenzophenone, p,p'-dihydroxydiphenyl methane, p,p'-dihydroxydiphenyl ethane, bis(2-hydroxynaphthyl) methane, 1,5-dihydroxynaphthylene and the like, with Bisphenol A being preferred. These polyepoxide resins are well known in the art and are made in desired molecular weights by reacting the epihalohydrin and the dihydric phenol in various ratios or by reacting a dihydric phenol with a lower molecular weight polyepoxide. Particularly preferred polyepoxide monomers are glycidyl polyethers of Bisphenol A having epoxide equivalent weights of about 180 to about 1000.

The polyepoxide resins can be represented by the general formula:

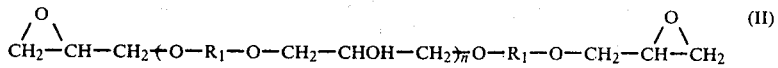

wherein $R_1$ is a divalent hydrocarbon radical of a dihydric phenol and n is an integer. While for any single molecule of the polyether, n is an integer, the obtained polyether is a mixture of compounds and the determined value for n constitutes an average which is not necessarily a whole number. Thus, the average value of n of the polyepoxide employed to prepare the adduct is not greater than 5 and can vary from about 0 to about 5, and preferably from about 0.2 to about 5. The particular n value selected will depend on the collective set of properties sought to be imparted to the resulting film. For example as the value of n increases from 0 to 5, the drying speed, pot life, and organic volatile content of the formulation increases while the wet edge time and solvent resistance decreases.

The epoxide equivalent weight of the polyepoxides having the above n values will be not greater than about 1000, and preferably from about 190 to about 900.

If the average value for n in formula (II) is increasingly greater than about 5 the solvent resistance of the film prepared therefrom is increasingly reduced and the first component requires excessive amounts of co-solvent to disperse or solubilize the end capped adduct.

In preparing the epoxy-amine adducts of this invention, the polyepoxide resin and the polyamine are reacted under such conditions that the adduct so formed contains about 1 mole of adduct polyamine molecule for each epoxide equivalent originally present in the polyepoxide resin, i.e., about one mole of polyamine is reacted with each epoxide equivalent of the polyepoxide resin. This polyamine-polyepoxide resin adducting reaction is carried out using about 1 to about 10 moles of polyamine for each epoxide equivalent of the polyepoxide resin. When the reaction is completed, i.e., when all the epoxide groups have reacted, substantially all of the excess unreacted polyamine is removed.

The preparation of adducts of polyepoxide resins and polyamines is described in detail in U.S. Pat. Nos. 4,093,594 and 4,111,900, the disclosures of which are hereby incorporated by reference. When the adducting reaction is completed, unreacted amine, if any, by vacuum distillation or by steam sparging under vacuum distillation, at temperatures of not greater than about 400° F. If temperatures in excess of 400° F. are employed the adduct will discolor. The steam sparging is conducted in a manner sufficient to reduce the presence of unreacted amine in the adduct to an amount not greater than about 0.5%, by weight, based on the weight of the adduct. If unreacted amine is present in amounts greater than about 0.5%, the pot life of the microemulsion which forms upon mixing the two components described herein will be reduced substantially.

The average molecular weight of the adduct when prepared from the polyepoxide resins having the appropriate n values as described herein can vary from about 460 to about 2200, and preferably from about 580 to about 2100.

The identity and amount of end capping agent which is used to react with the amine nitrogens of the epoxy-amine adduct is selected to improve the ability of the coating composition to wet a substrate to which it is applied and still maintain an acceptable balance of composition and film properties required in the coating. In addition to improving the wettability of the coating composition, the end capping agent should be employed in an amount sufficient to react with substantially all primary amine groups (thereby providing extended pot life) and yield an end capped adduct which is compatible with the crosslinker employed, in the sense that a film prepared from the coating composition exhibits high gloss.

It has been found that end capping agents which meet these requirements include a monoepoxide or mixture of monoepoxides having (a) one 1,2-epoxide group per molecule and no other groups which are reactive with amine groups and (b) between about 9 and about 16, preferably between about 10 and 15, carbon atoms per molecule. Moreover, at least 25 mole percent, preferably about 35 to about 100 mole percent, of the end capping agent must be an aliphatic monoepoxide, i.e., those monoepoxides derived from aliphatic alcohols, mono basic carboxylic acids, terminal olefins, and the like.

As the number of carbon atoms in the monoepoxide end capping agent increasingly drops below about 9, there is an increasingly greater reduction in the wettability and viscosity stability (pot life) of the coating composition. As the number of carbon atoms increasingly exceeds about 16 carbon atoms, the film forming compatability, film hardness and viscosity stability of the end capped adduct and crosslinker are increasingly reduced.

Similarly, as the mole fraction of the aliphatic monoepoxides in the end capping agent drops below about 25%, there is a substantial reduction in the wettability of the coating composition.

When, however, the epoxy-amine adduct is prepared from a polyepoxide of structural formula II wherein the average value of n is not greater than about 2 and then reacted with an aliphatic monoepoxide, a substantial proportion of the weight of the end capped adduct will be attributed to the monoepoxide and the aromatic content (contributed by the polyepoxide portion of the adduct) of the end capped adduct will be reduced to the point where incompatability with the aromatic epoxy resin crosslinker will occur. The incompatability of the end capped adduct and the crosslinker is manifested by a reduction in the gloss property of the cured coating.

Consequently, when the average value of n in structural formula II is not greater than about 2, the end capping agent, in addition to the requisite minimum aliphatic content, must also contain at least some aromatic monoepoxides to achieve the proper aliphatic- /aromatic balance in the resulting end capped adduct. The amount of aromatic monoepoxide which is needed to offset the undesirable effect of the aliphatic monoepoxide on gloss will depend not only on the extent to which the value of n in the polyepoxide resin used to prepare the adduct decreases below 2, but also on the number of carbon atoms in the aliphatic monoepoxide, since both parameters affect the aliphatic content of the resulting end capped adduct.

For example, when the epoxy-amine adduct is derived from triethylene tetramine, the polyepoxide resin is a glycidyl polyether of Bisphenol A having an average value of n of 0.2, and the aliphatic portion of the end capping agent is a mixture of monoglycidyl ethers of aliphatic alcohols having 10 to 12 carbon atoms, at least 60 mole percent, preferably at least 65 mole percent of the end capping agent must constitute at least one aromatic monoepoxide. When the average value of n is increased to 2.0, satisfactory compatibility can be achieved when at least 20, preferably at least 40 mole percent, of the end capping agent is an aromatic monoepoxide.

When the n value of the polyepoxide, e.g., the glycidyl polyether of Bisphenol A, is increased to, about 4 to about 5, no aromatic monoepoxide is required in the end capping agent to achieve compatibilization. Moreover, as the average number of carbon atoms in the aliphatic monoepoxide which constitutes a portion of the end capping agent decreases from 16 to 9, the corresponding mole fraction or percent of the aromatic monoepoxide in the end capping agent required to achieve compatibilization will also decrease for any given value of n of 2 or less.

Thus, the amount of the aromatic monoepoxide in the end capping agent is controlled to improve the compatibility of the end capped adduct with the crosslinker, i.e., impart a minimum gloss to a cured enamel film of at least 80 units at 60°, as determined by spectrophotometric analysis. The method for determining gloss is described in the examples.

Representative examples of suitable aliphatic monoepoxides for use in the end capping agent include monoepoxidized terminally unsaturated straight chain hydrocarbons (also known as terminal olefin oxides) having between about 9 and about 16, preferably between about 11 and about 14, carbon atoms and mixtures thereof, such as decylene oxide, undecylene oxide, dodecylene oxide, tridecylene oxide, tetradecylene oxide, and pentadecylene oxide; monoglycidyl ethers of aliphatic alcohols, said glycidyl ethers having between 9 and 16 carbon atoms, and mixtures thereof, such as octyl glycidyl ether, nonyl glycidyl ether, decyl glycidyl ether, and dodecyl glycidyl ether; and monoglycidyl esters of saturated tertiary monocarboxylic acids, said esters having between about 9 and about 16, preferably between about 11 and about 14 carbon atoms, such as the glycidyl ester of versatic acid (i.e., a mixture of 9 to 11 carbon carboxylic acids used to make Cardura E), tert-octanoic acid, tert-nonanoic acid, tert-decanoic acid, tert-undecanoic acid, and tert-dodecanoic acid.

Representative examples of aromatic monoepoxides, i.e., at least one aromatic ring containing compound having attached thereto an epoxy functional group and no other reactive functional groups, include the monoglycidyl ethers of monohydric aromatic alcohols such as phenol and naphthanol, alkyl substituted monoglycidyl ethers of monohydric aromatic alcohols, said alkyl groups having from about 1 to about 4, or higher, carbon atoms, such as the monoglycidyl ether of p-t-butyl phenol and o-cresol. The preferred aromatic monoepoxide is o-cresol glycidyl ether.

The preferred aliphatic end capping agents include mixtures of mnoglycidyl ethers of straight chain aliphatic monohydric alcohols, said ethers having 11 to 15 carbon atoms, mixtures of terminal olefin oxides having 11 to 14 carbon atoms, and mixtures of glycidyl esters of saturated tertiary monocarboxylic acids, said esters having 12 to 14 carbon atoms.

When the epoxy-amine adduct formation has been completed and unreacted amine has been removed, the end capping agent is reacted therewith at a temperature of about 65° C. to about 150° C. for a time sufficient to bring the reaction to completion, typically about 5 minutes to 3 hours. Lower temperatures may be employed at the expense of increasing the reaction time.

Alternatively, the polyepoxide resin and the end capping agent may be blended and the blend added over a period of about 0.5 to about 10 hours to the selected polyamine at the appropriate molar ratios, e.g., 2 moles polyamine, 1 mole diepoxide, and 2 to 3 moles of end capping agent. The mixture is heated from 25° to 150° C. and any unadducted polyamine is removed by vacuum distillation.

The maximum amount of the end capper which can be reacted with the epoxy-amine adduct is influenced by whether a monoepoxide is employed as a diluent for the epoxy resin crosslinker as described hereinafter. It has been found that if too many of the reactive amine groups on the epoxy-amine adduct are defunctionalized before or during reaction with the crosslinker, either by reaction with the monoepoxide end capping agent or by eventual reaction with the diluent which can accompany the crosslinker, then the crosslinker will not react to the desired extent with the end capped adduct and the cured film will be soft and exhibit poor solvent resistance. Such defunctionalization of the end-capped adduct will occur when the amount of end capping agent exceeds that amount which would theoretically eventually lead to a reduction in the reactive amine hydrogen functionality per molecule of end capped epoxy-amine adduct to below about 3 by reaction with monoepoxide regardless of its source.

The minimum amount of end capping agent which is reacted with the epoxy-amine adduct is controlled by the improvement in wettability sought to be imparted to the coating composition and the adverse effect on pot life which the presence of primary amines on the end capped adduct would impart to the coating composition.

The presence of primary amines on the end capped epoxy-amine adduct in an aqueous system reduces the pot life of the system to an unacceptable extent due to their high reactivity and will result in either a rapid viscosity drop or increase depending on the molecular weight of the polyepoxide employed to prepare the epoxy-amine adduct.

Thus, the amount of end capping agent must at least be sufficient to eliminate the presence of primary amines on the epoxy amine adduct by reacting at least 2 moles, and preferably about 2 to about 3 moles (depending on the functionality of the amine in the epoxy-amine adduct), and the selectivity of the primary amine-epoxide reaction) of end capping agent for every mole of epoxy-amine adduct.

The amine nitrogen equivalent weight of the end capped epoxy-amine adduct will generally be from about 100 to about 700, and preferably from about 150 to about 500. The amine hydrogen equivalent weight of the end capped epoxy-amine adduct will generally vary from about 100 to about 900.

The first component of the coating system containing the monoepoxide end capped epoxy-amine adduct may require the addition of a co-solvent thereto depending on the physical state and water reducibility of the salted adduct. When the end-capped adduct is a solid, the co-solvent serves to fluidize the adduct for handling and can also assist the solubilization or dispersion of higher molecular weight salted adducts into water.

The end capped epoxy-amine adduct will generally be a solid when it possesses a molecular weight of greater than about 1400 (e.g., when n in structural formula II of the polyepoxide from which the adduct is prepared is at least about 1). When the molecular weight of the end capped epoxy amine adduct is less than about 1400, the partially salted adduct is readily reducible with water alone and the addition of the co-solvent may be omitted. In practice, some co-solvent is preferred to aid microemulsification and coalescence during film formation.

Thus, in those instances where a co-solvent is employed, it is added to the end capped epoxy-amine adduct after removal of the reaction medium and unreacted amine.

The amount of the co-solvent which is added is not greater than about 45%, and is typically from about 5 to about 45%, by weight, based on the weight of end capped adduct and co-solvent. The amount of the co-solvent added is preferably controlled not to exceed 35% to comply with environmental pollution regulations.

Regardless of whether a co-solvent is employed, the end capped adduct must eventually be converted to its salt by reaction with a suitable volatile acid. However, either the solventless end capped epoxy-amine adduct or the end capped epoxy-amine adduct and co-solvent mixture may be formulated as an intermediate and converted to its salt form by the user of the coating system.

The degree of salting of epoxy amine adduct is herein defined to be the number of equivalents of acid sufficient to react with the total number of amine nitrogen equivalents in the end capped epoxy amine adduct expressed as a percentage of the total number of amine nitrogen equivalents in the system. Thus, a 25% degree of salting indicates that the end capped epoxy-amine adduct has been reacted with sufficient acid to convert 25% of the amine nitrogens present on the adduct to their corresponding salt.

The particular degree of salting is selected to control, as desired, a number of factors such as cure temperature, cure speed, pot life and dispersability.

As the degree of salting increases, the cure temperature over a fixed period of time increases along with pot life and visa versa. For industrial maintenance coatings the degree of salting is selected to achieve an ambient temperature curing system and the associated reduction in pot life at the lower degrees of salting is an acceptable trade off.

Thus, the end capped epoxy amine adduct is reacted with sufficient acid to achieve a degree of salting of from about 15 to about 85%, preferably from about 20 to about 65%, and most preferably about 20 to about 60%.

The pH of the first component when salted to the degree described herein will be not less than about 6.0, preferably from about 6.2 to about 9. If the pH falls below about 6.0, flash rusting of the ferrous metal substrates may result. Flash rusting occurs when the acid in the coating composition causes the formation of ferrous ions which permeate the film surface as it drys. The ferrous ions at the film surface are then oxidized to ferric ions which imparts an unsightly reddish or yellow color to the coating.

As described above, the end capped epoxy-amine adduct is converted to its corresponding salt by reaction with a volatile organic or inorganic acid. A volatile acid is herein defined to be an acid which will substantially completely evaporate at the temperature at which drying and curing occur. The volatile organic acids may be aliphatic, cycloaliphatic, or heterocyclic and may be saturated or unsaturated.

Representative examples of volatile organic acids include acetic acid, formic acid, propionic acid, butyric acid, acrylic acid, methacrylic acid, and cyclohexanoic acid. The organic acid will preferably be an aliphatic monocarboxylic acid having up to 4 carbon atoms.

Representative examples of volatile inorganic acids include hydrochloric acid, hydrobromic acid, and hydrofluoric acid. The preferred acid is acetic acid.

Water may also be added to control the solids content and/or viscosity of the first component for handling as an intermediate prior to thinning with water for preparation of the addition of the crosslinker.

Preferably this water is deionized to maintain consistency of coating properties although tap water may be employed if desired.

The salted end capped epoxy-amine adduct in addition to acting as the principal film forming resin of the cured composition acts as a surfactant aiding the incorporation of the epoxy resin crosslinker into the two component blend and the subsequent formation of a very small particle size emulsion.

The solids content of the salted end capped epoxy-amine adduct is controlled prior to mixing with the second component by dilution with water to be from about 15 to about 45%, by weight, based on the weight of the ingredients of the first component.

The specific solids content selected from the above range should be such that a fluid microemulsion is readily formed or eventually forms when the two components are mixed. The term "microemulsion" as used herein is described as a mechanically stable, small particle size emulsion in which at least a portion of the particles are less than about 0.14 μm in diameter, as evidenced by opalescence due to light scattering, and/or Tyndall beam effect in transparent or translucent compositions. The actual solids content selected for the first component can vary substantially depending on the identify of the ingredients used for each component. However, if the solids content of the first component is too high, a rapid viscosity increase occurs to such an extent upon blending of the two components that thorough blending is not practical. If the solids content is too low, there is little or no viscosity increase and when stirring ceases, the crosslinker immediately begins to settle out showing loss of blending capabilities.

Second Component

The second component of the two component coating system is a low molecular weight water insoluble epoxy resin crosslinker having more than one terminal epoxide group.

The epoxy crosslinkers suitable for use in the second component include the glycidyl polyethers of dihydric phenols represented by formula II as well as epoxy novolac resins.

The dihydric phenols employed to prepare the epoxy crosslinker are described above in connection with the polyepoxide used to prepare the epoxy-amine adduct. It is particularly preferred to employ those glycidyl polyethers wherein the dihydric phenol is Bisphenol A.

The glycidyl polyethers represented by structural formula II when used as a crosslinker have a low molecular weight wherein the average value of n in formula II can vary from about 0 to about 3, and preferably from about 0.1 to about 2.

The maximum molecular weight of the epoxy crosslinker is limited by the fact that the amount of crosslinker employed in the second component is usually selected to achieve stoichiometric equivalence of epoxy groups with the amine hydrogen equivalents of the end capped epoxy-amine adduct. Consequently, as the molecular weight of the epoxy crosslinker increases, thereby increasing the epoxide equivalent weight, more of the crosslinker is required to satisfy the stoichiometric requirement. However, the use of large amounts of epoxy crosslinker is disadvantageous because it is water insoluble and becomes increasingly more difficult to microemulsify or disperse as the amount thereof is increased.

In view of the above, it is preferred to characterize the epoxy crosslinker also in terms of its epoxide equivalent weight. Thus the epoxide equivalent weight (WPE) of the glycidyl polyethers of dihydric phenols is not greater than about 600, preferably from about 180 to about 200.

Other suitable epoxides which may be employed as crosslinkers include the glycidyl polyethers of novolac resins referred to as epoxy novolac resins. The epoxide equivalent weight of the epoxy novolac resins can vary from about 150 to about 250, preferably from about 170 to about 210.

As described above, the amount of epoxy crosslinker which is present in the coating composition is preferably sufficient to achieve substantially stoichiometric equivalence with the reactive amino hydrogens on the end capped epoxy-amine adduct. In general, it is preferred to employ the epoxy crosslinker in an amount sufficient to achieve an epoxy to reactive adduct amine hydrogen equivalent weight ratio of from about 0.5:1.0 to about 1.5:1.0, and, preferably, from about 0.9:1.0 to about 1.1:1.0.

The epoxy resin crosslinker will require the presence of a diluent when it is a solid and it will preferably be present when the crosslinker is a high viscosity liquid. The mere simple mixing of a solid crosslinker with the end capped epoxy-amine adduct will not achieve dispersal of the crosslinker in the microemulsified state. As the viscosity at room temperature of the crosslinker increases above about 10,000 cps, the presence of the diluent will become increasingly more preferred. At crosslinker viscosities greater than about 100,000 cps, a diluent is almost always employed.

The diluents are selected from the group consisting of co-solvents, monoepoxides, aliphatic polyglycidyl ethers and aqueous dispersions or solutions of nonionic surfactants.

The co-solvent diluent is the same co-solvent employed in conjunction with the end capped epoxy-amine adduct and the description provided herein of the identity of the co-solvent is equally applicable to the co-solvents employed in the first component.

The co-solvent which can be employed in the present invention is herein defined to be an organic aliphatic hydroxyl containing solvent which is not reactive with other components in the system and which is characterized as possessing a specifically defined solubility parameter polar components ($\delta_p$) of from about 2.8 to about 4.5 (cal/cm$^3$)$^{\frac{1}{2}}$, and preferably from about 3.5 to about 4.5 (cal/cm$^3$)$^{\frac{1}{2}}$.

The solubility parameter polar component of a solvent is determined from the following equation:

$$\delta_P = \sqrt{\frac{12108(\epsilon-1)}{V_m^2 \, 2 + m_D^2}(n_D^2 + 2)n^3 \frac{\text{cal}}{\text{cm}^3}}$$

wherein
$\epsilon$ = dielectric constant, static value, of the co-solvent;
$n_D$ = the index of refraction for the sodium-D line of the co-solvent;
u = dipole moment, Debyes of the co-solvent; and
$V_m$ = molar volume(cm$^3$) of the co-solvent.

For a further discussion of polar solubility parameters, see M. Hansen and K. Skaarup, *Independent calculation of The Parameter Components*, 39 Journal of Paint Technology 511 (1967), the disclosure of which is herein incorporated by reference.

Thus, any non reactive (i.e., non-reactive with the components of the coating system) organic aliphatic hydroxyl containing co-solvent having a solubility parameter polar component within the above ranges may be employed in preparing both the first and second components of the coating system described herein.

Typical co-solvents include aliphatic alcohols, and glycol ethers. Representative examples of suitable aliphatic alcohols and glycol ethers with their associated solubility parameter polar component in (cal/cm$^3$)$^{\frac{1}{2}}$ include 2-ethoxyethanol (4.2) n-propanol (3.3), n-butanol (2.8), isopropanol (4.2), 2-butoxyethanol (3.1) diacetone alcohol (4.0) and diethylene glycol monobutyl ether (3.4).

The use of ester solvents should be avoided due to their tendency to react with amines thereby reducing film curing potential.

The preferred co-solvent is ethylene glycol monoethylether.

In addition to the hydroxyl containing co-solvents, minor amounts of other solvents, e.g., other alcohols, ketones, organic carbonates, aromatic hydrocarbons, cyclic ethers and the like, can be included in a co-solvent blend, providing the polar solubility parameters of the blend meet the aforestated range.

If a co-solvent having a solubility parameter polar component outside the range of 2.8 to 4.5 (cal/cm$^3$)$^{\frac{1}{2}}$ (assuming other conditions are employed as described herein) is employed in conjunction with the end capped epoxy-amine adduct, a dispersion of the epoxy crosslinker may form having a much greater particle size which settles within a few hours, thereby substantially reducing the pot life of the coating composition.

The monoepoxides which can be employed as diluents for the epoxy resin crosslinker contain only one 1,2-epoxide group and no other groups reactive with amine groups, preferably between about 9 and about 16 carbon atoms, and are capable of dissolving the crosslinker at room temperature (e.g., from about 20° to about 30° C.). Such monoepoxides include all of the monoepoxides which can be employed as end capping agents as discussed herein such as monoepoxidized terminally unsaturated straight chain hydrocarbons, monoglycidyl esters of saturated tertiary monocarboxylic acids, monoglycidyl ethers of aliphatic alcohols, and monoglycidyl ethers of aromatic and alkyl substituted aromatic monohydric alcohols.

Aliphatic polyglycidyl ethers having from about 10 to about 50 carbon atoms can also be employed as diluents. Such polyethers are derived by reacting aliphatic polyols such as ethylene glycol, propylene glycol, glycerol and the like with an epihalohydrin.

The aromatic or alkyl substituted aromatic monoepoxides in addition to fluidizing the epoxy crosslinker also serve to prevent crystallization of the crosslinker over long periods of time and thereby improve the shelf life of the second component when employed in amounts of at least 5%, by weight, based on the weight of crosslinker and diluent.

The third type of diluent for the epoxy crosslinker is water having a nonionic surfactant present therein either in the dispersed or dissolved state. Such surfactants must be capable of dispersing the crosslinker and include the series of surfactants which are know under the trademark Pluronics. These surfactants are prepared from polypropylene oxide and polyethylene oxide and have a molecular weight of from about 8,000 to about 15,000.

The preferred surfactant is the reaction product of polyethylene glycol having a weight average molecular weight of about 4,000 to about 9,000 and the diglycidyl ethers of Bisphenol A wherein the average value of n can vary from about 0 to about 4 and having an epoxide equivalent weight of from about 180 to about 700, said reaction being conducted at a molar ratio of glycol to epoxy resin of from about 3:1 to about 5:4. The addition reaction is carried out in the presence of a Lewis acid catalyst and an inert processing solvent such as toluene at a temperature of about 50° to about 75° C.

The preferred class of diluent is an aliphatic monoepoxide.

The amount of diluent which is mixed with the crosslinker depends on the identity of the diluent. When the diluent is a co-solvent, monoepoxide, or an aliphatic glycidyl polyether, the diluent is present in the crosslinker package in an amount which does not exceed about 40%, typically from about 5 to about 30%, by weight, based on the weight of diluent and crosslinker.

When the diluent is an aqueous surfactant solution, it is present in the crosslinker package in an amount not exceeding 75%, and preferably from about 40 to about 60%, by weight, based on the weight of the crosslinker package (i.e., diluent and crosslinker). The surfactant itself is dissolved or dispersed in the crosslinker package in an amount of from about 3 to about 12%, by weight, based on the weight of the epoxy crosslinker resin.

The monoepoxide, aliphatic polyglycidyl ether and co-solvent diluent dissolve the crosslinker while the surfactant solution disperses it to yield a fluid emulsion.

When the two components described above have been prepared, they are mixed together with simple stirring, such as by using a spatula. Upon mixing, the mixture becomes initially opaque, creamy and viscous. However, within a short time with continuous stirring the mixture becomes either translucent or transparent as a microemulsion forms, or remains opaque but develops some opalescence indicating that some fraction of particles are below 0.14 micron in diameter.

The particle size of the epoxy resin crosslinker in the microemulsion is preferably controlled to be from about 0.01 to about 0.2 micron. When the particle size of the emulsified crosslinker is less than about 0.01 micron, the system requires excessive dilution with water to attain a viscosity suitable for application. Moreover, at increasingly smaller particle size, the reactivity of the system is increased with a reduction in pot-life.

The solids content of the unpigmented coating composition obtained by mixing components I and II is controlled by dilution with water, if necessary, to be from about 15 to about 60%, preferably from about 20 to about 50%, by weight, based on the weight of the total composition.

The coating composition can also contain pigments of the conventional type such as iron oxides, lead oxides, strontium chromate, carbon black, titanium dioxide, talc, barium sulfate, phthalocyanine blue and green, cadmium red, chromic green, lead silicate, silica, silicates and the like. However, iron blue pigment, calcium carbonate and pigments considered reactive because of their basic nature are not compatible in the coating system when used in appreciable quantities. Such pigments can be added to the first and/or second components prior to mixing them together.

Defoamers, tints, slip agents, thixotropes, etc., are common auxiliary components to most coatings and may be employed in the composition of the present invention.

When components I and II are mixed, the resulting coating composition exhibits a pot life at room temperature of from about 4 hours to about 3 days, and preferably from about 5 hours to about 2 days.

The pot life of the coating composition is herein defined to be the lapse time from mixing the components together until the resulting composition is no longer suitable with normal thinning for application by spray, brush, or roll coating techniques to a substrate. The suitability for application by common techniques can be expressed in terms of the viscosity of the coating composition. Thus, the pot life of unpigmented coatings can be characterized as the lapse time from mixing the two components to the time when the viscosity of the coating compositions drops below $A_1$ or increases above Z as determined by the Gardner-Holdt method. For pigmented coatings, useful application viscosities are between 50 and 150 Kreb Units (K.U.) as determined with a Stormer viscometer. Typically the viscosity of the coating composition will increase until the microemulsion either breaks, in which case the crosslinker settles into a separate layer accompanied by a substantial reduction in viscosity, or until crosslinking reactions take place accompanied by a substantial increase in viscosity.

Coatings based on the compositions described herein can be formulated into easily handled two-package systems which blend together as easily as their solvent based counterparts. Application properties are excellent. Application by brush, spray and roller-coating are remarkably free of bubbling and other film imperfections.

One of the outstanding advantages of the coating systems described herein is their ability to cure fully when applied to damp masonry surfaces. Overnight recoating is possible even under adverse damp conditions with most formulations. Applications of complete water based systems (blockfiller and glaze coats) to concrete block walls can circumvent the long troublesome field problem of loss of intercoat adhesion when using a latex block-fill with an epoxy topcoat under damp conditions. The coating systems described herein also provide excellent sealing over such porous substrates as wood and wall board and a multitude of masonry substrates. Since the coating of wood surfaces, such as fir plywood and yellow pine, provides excellent sealing and freedom from nap raising, such coatings can be used for sealing plywood forms for concrete work.

The coating systems described herein also exhibit good adhesion to such widely varied substrates as galvanized metal, cold rolled steel (untreated and phosphate treated), hot rolled steel, and aluminum. Flash rusting is not a problem over untreated steel and, therefore, there is no need for special additives as in some water reducible epoxy systems. Adhesion is also excellent to three and four-year old alkyd and epoxy ester enamel films. Such systems may therefore be employed for repaint purposes in food processing plants and dairies and can also be used as adhesive compositions per se.

A further advantage of the coating system described herein is their low content of organic volatiles. Such systems are actually more odor-free than typical polyvinyl acetate emulsion and acrylic interior wall paints. Consequently, these coatings may be used in such places as hospital and school corridors and rooms.

The invention is additionally illustrated in connection with the following Examples which are to be considered as illustrative of the present invention. It should be understood, however, that the invention is not limited to the specific details of the Examples. All parts and percentages in the claims as well as in the remainder of the specification are by weight unless otherwise specified.

EXAMPLE 1

Part A

Preparation of End Capped Epoxy-Amine Adduct

To a suitable reactor equipped with a stirrer, inlet tube and reflux condenser are added 415 parts of toluene and 966 parts of pulverized epoxy resin, which is the diglycidyl ether of Bisphenol A having an average value of n=4, and an epoxide equivalent weight of 782. The contents are heated to reflux temperature and stirred until the epoxide resin is dissolved. The temperature of the solution is allowed to cool to 53° C. and 636 parts of diethylene triamine are added. The temperature is maintained between 50° and 55° C. for 1 hour and then raised to 100° C. for an additional hour. Unreacted amine and solvent are removed by distillation at 200° C. under a vacuum of 28.5 inches of Hg for 10 minutes followed by steam sparging under vacuum for 20 minutes. Steam is discontinued and the vacuum is released with nitrogen gas. The molten resin is thinned with 741 parts of ethylene glycol monoethyl ether and cooled to room temperature.

284.5 parts of the monoglycidyl ethers of a mixture of saturated straight chain aliphatic monohydric alcohols, said alcohols having 8 to 10 carbon atoms, are then added to end cap the epoxy-amine adduct. The reaction mixture is maintained at room temperature for 16 hours and then heated for 8 hours at 50° C. to complete the end capping reaction.

The resulting monoepoxide end capped adduct exhibits a nitrogen content of 3.48%, a nitrogen equivalent weight of 380 and an amine hydrogen equivalent weight of 380. The product is a liquid having a Gardner-Holdt viscosity of $Z_5$ at a solids content of 65%.

PART B

Preparation of Epoxy Resin Crosslinker Emulsion

To a suitable vessel equipped with a high speed stirrer are added 926.2 parts of the diglycidyl ether of Bisphenol A having an average value of n of 0.2 and an epoxide equivalent weight of 189. 121.9 parts of an aqueous solution containing 40% of a nonionic surfactant, which is the reaction product of polyethylene glycol (MW 6,000) and the diglycidyl ether of Bisphenol A having an average value of n=2, at a molar ratio of glycol to epoxy resin of 2:1, are then added. Under high speed agitation, 121.9 parts of water are slowly added to the mixture to form a water dilutible emulsion which is subsequently thinned with 341.3 parts of water to achieve a solids content of 60%. The emulsion is white and opaque, has a Brookfield viscosity of 6000 cps at 25° C., and a particle size between 1 and 5 microns.

PART C

Preparation of Industrial Maintenance Paint Formulation 270.6 parts of the end capped epoxy-amine adduct solution of Part A and 293.4 parts rutile titanium dioxide are blended in a high speed disperser to achieve an enamel grind rating of 6 minimum, on a Hegman gauge. The temperature of the paste reaches 150° F. When the proper texture is reached, 16.1 parts of glacial acetic acid and 1.0 part of Drew L-475 defoamer (available from Drew Chemical Co.) are added thereto. The resulting paste is then thinned with 345 parts of deionized water and an additional 1.0 part of Drew L-475 defoamer is added. The degree of salting of the end capped adduct is 60% and the solids content of the resulting pigmented aqueous solution of end capped epoxy-amine adduct is 50.6%.

To 213.6 parts of the pigmented portion are then added 35.5 parts of the dispersion to part B and 20 parts of water. The total solids content of the mix is 48.1% of the mix. The viscosity of this mix is 75 Kreb Units (KU) at 25° C.

The properties of this coating are determined in accordance with a number of different test procedures. Thus, the Stormer viscosity is measured in Kreb Units (KU) with a Stormer viscometer as a function of time. The sag resistance is measured on a Leneta 3 to 12 mil anti-sag meter. This test indicates the number of wet mils of paint which will not sag when a freshly cast film is positioned vertically and allowed to dry. Gloss is measured at 60° on draw downs of the paint formulation cast 8 and 24 hours after mixing of portions A & B. Test films are cast with a Bird applicator using an application blade laying down a 0.004 inch thick wet film on a glass panel. Each wet draw down is allowed to dry for 24 hours before the gloss measurement is taken. The results are in units of percent reflection as determined by spectrophotometric measurements.

The results of these tests are summarized at Table I.

As may be seen from the data of Table I, the formulation exhibits good viscosity stability, and films prepared therefrom exhibit high gloss and sag resistance.

EXAMPLE 2

Example 1 is repeated with the exception that 215 parts of the pigmented portion of Example 1 Part C, which has been salted to a degree of 55%, are blended with 23.4 parts of a mixture of 87 parts crosslinker in 13 parts of ethylene glycol monoethyl ether followed by 24 parts of water.

The pH of the mix is 6.3 and the total solids content of the mix is 49.3%.

The resulting paint formulation is tested in accordance with Example 1 and the results summarized in Table I. The resulting formulation is also employed to prepare films which are tested for chemical and stain resistance in accordance with Example 6 and the results summarized at Table VI.

PART C

Preparation of Industrial Maintenance Paint Formulation

To 156.3 parts of the mixture of part B is added 200 parts of rutile titanium dioxide pigment and the mixture is ground on a high speed disperser to a minimum grind rating of 7 on a Hegman scale. The resulting paste is then blended with 19.5 parts of the 40% NV aqueous surfactant solution employed in Part B of Example 1.

TABLE I

| | Stormer Viscosity (KU) | | | Sag resistance (mils passed) | | | Gloss (% Reflectance) | | |
|---|---|---|---|---|---|---|---|---|---|
| Example No. | Fresh | Cast 8 hrs. After Mix | Cast 24 hrs. After Mix | Fresh | Cast 8 hrs. After Mix | Cast 24 hrs. After Mix | Fresh Mix | Cast 8 hrs. After Mix | Cast 24 hrs. After Mix |
| 1 | 75 | 86 | 76 | 8 | 8 | 6 | 100 | 100 | 100 |
| 2 | 94 | 77 | 61 | 9 | 8 | 5 | 100 | 100 | 100 |

EXAMPLE 3

Part A

Preparation of the End Capped Epoxy-Amine Adduct

An end capped epoxy-amine adduct is prepared by reacting 146 parts triethylene tetramine with a blend of 191 parts of the diglycidyl ether of Bisphenol A, having an average value of $n=0.2$ and an epoxide equivalent weight of 191, 177.3 parts of o-cresol glycidyl ether (WPE=197), and 104.6 parts of a mixture of monoglycidyl ethers of straight chain aliphatic monohydric alcohols, said ethers having between 13 and 15 carbon atoms, at a temperature of 50° C. After the epoxy resin blend has been added to the amine, the reaction mixture is held for 1 hour at 50° C. and the temperature then raised to 200° C. A vacuum of 28.5 in. Hg is applied and steam is then sparged through the batch for 20 minutes to remove a small fraction of unadducted amine. The steam is then discontinued, and the vacuum released with nitrogen. 154.7 parts of ethylene glycol monoethyl ether are then used to thin the end capped amine adduct to a solids content of 80%. The percent amine nitrogen of the end capped epoxy-amine adduct is 7.8%. To 550 parts of this end capped epoxy-amine adduct solution are added 37.8 parts of glacial acetic acid and 145.5 parts water. The degree of salting of the amine groups of the end capped adduct is 25%. The resulting solution is viscous and clear, exhibiting a Gardner-Holdt viscosity of $Z_4$, a solids content of 60%, and a pH of 9.2.

The end capped adduct has a nitrogen equivalent weight of 174.5, and an amine hydrogen equivalent weight of 186.3.

PART B

Preparation of Epoxy Resin Crosslinker and Reactive Diluent Blend

To 150 parts of diglycidyl ether of Bisphenol A having an epoxide equivalent weight of 191, are added 50 parts of the monoglycidyl ethers of a mixture of saturated straight chain aliphatic alcohols, said alcohols having between 10 and 12 carbon atoms, and the mixture is stirred to yield a fluid homogeneous blend having a Stormer viscosity of 58 KU.

The mixture is then subjected to high speed agitation with the addition of 202.8 parts of deionized water to form an aqueous dispersion of the pigmented crosslinker and monoepoxide which is storage stable.

235.6 parts of the solution of Part A is further diluted with 189.1 parts of deionized water and this thinned solution, which is storage stable, is blended together with an equal volume of pigmented crosslinker (578.6 parts) to form a white maintenance enamel.

The solids content of the paint composition is 52.5%. The Stormer viscosity of the paint formulation is tested periodically throughout the first four hours after mixing and the results are summarized at Table II. As can be seen from the results of Table II, the pot life of the formulation is about 4 hours. A longer pot life can be achieved by increasing the degree of salting of the end capped adduct but at the expense of film hardness development.

Gloss is also tested in accordance with Example 1 and found to be 98% reflectance. A 0.003 inch thick cast film sample made by a draw down of the paint composition using a Bird applicator blade is found to be dry and tack free after 8 hours. A print free test is conducted by pressing the thumb on a film sample. When no thumb print is observed after 18 hours, the film is characterized as print free.

The pencil hardness is also determined on a 0.003 inch thick film sample as a function of drying time. The results are summarized at Table II.

A 0.003 inch thick film is applied to a glass plate and allowed to air dry at 25° C. for 24 hours. Several drops of water are then puddled on the film and allowed to remain there for 1 hour. The drop is then blotted up. This test is referred to herein as the drop test. No visable effect on the film is observed.

In each case when a film sample is prepared, a smooth and glossy film is achieved. The absence of craters, crawling, and pin holes in the film indicates that the film exhibits good wettability and air release.

TABLE II

| Stormer Viscosity (KU) | | Pencil Hardness (ASTMD-3363) | |
|---|---|---|---|
| Fresh | 85 | 1 Day | 4B |
| 1 hr | 89 | 4 Days | B |
| 2 hr | 89 | 7 Days | F |
| 3 hr | 91 | | |
| 4 hr | 139 | | |

EXAMPLE 4

A salted end capped polyamine terminated epoxy adduct is prepared in accordance with Example 3 Part A and diluted with water to bring the solids content to 60%. To 160 parts of the salted adduct are added 250 parts of rutile titanium dioxide pigment and the mixture ground on a high speed disperser to a texture of 10 on a Paint Club scale. To the resulting paste are added an additional 79.0 parts of the salted end capped adduct and the mixture is diluted with 394 parts of deionized water to bring the solids content to about 45%.

To 883 parts of the pigmented end capped adduct portion are added 168.5 parts of a mixture of polyepoxide resin crosslinker and monoepoxide diluent described in Example 3, Part B. The crosslinker and diluent are present in the mixture at a weight ratio of 75:25. The crosslinker and diluent blend becomes dispersed in the microemulsified state upon mixing. The solids content of the microemulsion coating is about 53%.

The properties of the formulation are determined in accordance with a number of different test procedures. Accordingly, the Stormer viscosity of the microemulsion is tested periodically every hour. The results are shown at Table III. The Gloss is tested in accordance with Example 1 and found to be 99% reflectance. The cure response time at room temperature, 40° F., and elevated temperatures (i.e., 200° to 300° F.) is determined by evaluation of pencil hardness, and solvent resistance (by the drop test according to Example 3) on cast films prepared in accordance with Example 3. The results are summarized at Table III.

TABLE III

Cure Response At Room Temperature: (70–75° F.)

Pencil Hardness on Phosphated Steel After:

| | |
|---|---|
| 20 Hrs. | 4B |
| 72 Hrs. | F |
| 1 Week | 2H |

Solvent Resistance by Spot Test:

| Solvent | Observations |
|---|---|
| Xylol | No Softening after 48 Hours drying |
| Methyl Ethyl Ketone | No Softening after 96 Hours drying |

Cure Response At 40° F.:

Pencil Hardness on Phosphated Steel After:

| | |
|---|---|
| 48 Hrs. | 6B |
| 72 Hrs. | 3B |
| 96 Hrs. | B |
| 1 Week | HB |
| 2 Weeks | 2H |

Solvent Resistance by Spot Test:

| Solvent | Observations |
|---|---|
| Xylol | No Softening after 1 Week drying |
| Methyl Ethyl Ketone | No Softening after 2 Weeks drying |

Cure Response At Elevated Temperatures:

| Time/Temperature | Pencil Hardness | Gloss (60°) | Solvent Resistance (spot test) Xylol | MEK |
|---|---|---|---|---|
| 15 Min. 200° F. | F | 97 | Softens | — |
| 30 Min. 200° F. | 3H | 98 | Exc. | Exc. |
| 20 Min. 210° F. | H | 95 | Exc. | Exc. |
| 10 Min. 225° F. | 4H | 94 | Exc. | Exc. |
| 15 Min. 250° F. | 4H | 94 | Exc. | Exc. |
| 15 Min. 275° F. | 4H | 95 | Exc. | Exc. |
| 15 Min. 300° F. | 4H | 91 | Exc. | Exc. |

Stormer Viscosity

| Ageing Period (Hrs.) After Mixing | Voscosity (K.U.) |
|---|---|
| Fresh | 98 |
| 1 | 100 |
| 2 | 101 |
| 3 | 102 |
| 4 | 118 |
| 5 | 132 |
| 6 | 141 |
| 8 | Gel |

EXAMPLE 5

The purpose of this Example is to illustrate the effect of varying the number of carbon atoms in the monoepoxide used to end cap the epoxy amine adduct.

Thus, using procedures similar to Example 1, Part A, an epoxy-amine adduct is prepared by reacting diethylene triamine with the diglycidyl ether of Bisphenol A having an average value of n=3 and an epoxide equivalent weight of 661. The molar ratio of amine to epoxide resin in the adduct is 2:1. Reaction temperatures are maintained at 65° to 70° C. to favor reaction of the epoxy resin at the primary amine sites of the amine. After the excess amine and solvent are removed by steam sparging at 200° C. under a vacuum of 28.5 in. Hg, the solid form epoxy amine adduct is separated into a number of samples. Each sample is dissolved in ethylene glycol monoethyl ether and reacted with a different end capping agent which varies in carbon chain length. The end capped adducts have a solids content of 65% in ethylene glycol monoethyl ether solvent.

The end capping reaction is conducted by blending 50 parts of the 65% solution of the epoxy-amine adduct with an appropriate amount of end capping agent in a glass jar. A lid is secured loosely on the glass jars and each jar is left for 4 hours at 25° C. The lid is then secured on tight and each of the jars is placed in an oven at 50° C. for 2 days.

Each of the resulting end capped epoxy-amine adducts is salted with glacial acetic acid to a degree of salting of 25% and thinned with deionized water to a solids content of 30%. The appropriate amounts of co-solvent, acetic acid and water for each end capped adduct are summarized at Table IV.

To 50 parts of each of the salted sample solutions are then added a 60% aqueous emulsion of the epoxy resin crosslinker, which is described at Example 1 Part B, in stoichiometric proportions of 1 epoxide crosslinker equivalent per amine hydrogen equivalent. The mixed systems are thinned with water, if necessary, to obtain an application viscosity of B-E as determined by the Gardner-Holdt method. The appropriate amounts of crosslinker emulsion and water added to each sample mix are summarized at Table IV.

The viscosity of each sample mixture is measured periodically and the results summarized at Table V. A film of each sample mixture which has been aged for various periods as shown in Table V is cast on glass panels using a 4 wet mil Bird applicator (glass panels are employed because they are transparent, planar, and have surface wetting characteristics similar to metals). The visual appearance of each film is observed to evaluate wettability of the film. Crawling of the film indicates poor wettability.

As may be seen from the data of Table V, the use of end-capping agents with 7 or less carbon atoms results in poor film wettability and poor viscosity stability while the use of an 18 carbon atom end capping agent yields an end capped epoxy-amine adduct which is incompatible with the crosslinker.

Run 4 illustrates the undesirable effect of employing an end capping agent having less than 25 mole percent of aliphatic monoepoxides.

Runs 2 and 5 employ monofunctional end capping agents having acrylic unsaturation which reacts with amine groups by a Michael addition mechanism. The chain length of these end capping agents is insufficient to provide good film wetting and vehicle pot life.

The most preferred end capping agents are monoepoxides having between 11 and 14 aliphatic carbon atoms. The formulations employing these end capping agents evidence good wetting, compatibility, and viscosity stability.

TABLE IV

| Run No. | End Capping Agent | No. of Carbon Atoms in End Capping Agent | Weight of End Capping Agent Employed (gms) | Wt. of Ethylene Glycol Monoethyl ether (gms) | Nitrogen Equivalent Wt. of End Capped Aduct | Amine Hydrogen Equivalent Weight of End Capped Adduct | Wt. of Glacial Acetic Acid Added (gms) |
|---|---|---|---|---|---|---|---|
| 1 | Propylene Oxide | 3 | 2.47 | 1.33 | 274 | 274 | 1.78 |
| 2 | Acrylonitrile | 3 | 2.25 | 1.21 | 272 | 272 | 1.79 |
| 3 | Butyl glycidyl ether | 7 | 5.83 | 3.14 | 300 | 300 | 1.63 |
| 4 | Phenyl glycidyl ether | 9 | 6.42 | 3.46 | 305 | 305 | 1.60 |
| 5 | Diacetone acrylamide | 9 | 7.19 | 3.87 | 311 | 311 | 1.57 |
| 6 | Epoxide 7[1] | 11–13 | 9.78 | 5.27 | 331 | 331 | 1.47 |
| 7 | Nedox 1114[2] | 11–14 | 8.93 | 4.81 | 325 | 325 | 1.50 |
| 8 | Cardura E[3] | 12–14 | 10.76 | 5.79 | 339 | 339 | 1.44 |
| 9 | Epoxide 8[4] | 13–15 | 12.17 | 6.55 | 350 | 350 | 1.39 |
| 10 | Vikolox 18[5] | 18 | 12.42 | 6.69 | 352 | 352 | 1.39 |

| Run No. | End Capping Agent | Appearance at 30% Solids of End Capped Adduct | Viscosity at 30% Solids (Gardner-Holdt) | Wt. of Aqueous Emulsion of Crosslinker (gms) | Wt. of Water Added to get B-E vis. (gms) | Blend Solids Content (%) |
|---|---|---|---|---|---|---|
| 1 | Propylene Oxide | clear Yellow | B | 9.12 | 4 | 34.03 |
| 2 | Acrylonitrile | clear Yellow | B | 9.19 | 4 | 34.03 |
| 3 | Butyl glycidyl ether | clear Yellow | V | 8.33 | 7 | 30.99 |
| 4 | Phenyl glycidyl ether | clear Yellow | I | 8.20 | 7 | 30.99 |
| 5 | Diacetone acrylamide | clear Yellow | C | 8.04 | 5 | 32.39 |
| 6 | Epoxide 7[1] | clear Yellow | Z | 7.55 | 6 | 31.21 |
| 7 | Nedox 1114[2] | clear Yellow | L | 7.69 | 4 | 33.02 |
| 8 | Cardura E[3] | clear Yellow | U | 7.37 | 5 | 31.90 |
| 9 | Epoxide 8[4] | clear Yellow | X | 7.14 | 6 | 30.90 |
| 10 | Vikolox 18[5] | yellowish opaque | $Z_6$ | 7.10 | 7 | 30.08 |

[1]Epoxide 7 is a mixture of the monoglycidyl ethers of straight chain aliphatic monohydric alcohols, said ethers having 11 to 13 carbon atoms.
[2]Nedox 1114 is the mixture of terminal olefin oxides having 11 to 14 carbon atoms.
[3]Cardura E is a mixture of the glycidyl esters of saturated tertiary monocarboxylic acids, said esters having 12 to 14 carbon atoms.
[4]Epoxide 8 is a mixture of the monoglycidyl ethers of straight chain aliphatic monohydric alcohols having 13 to 15 carbon atoms.
[5]Vikolox 18 is a terminal olefin oxide having 18 carbon atoms.

TABLE V

| Run No. | End Capping Agent | No. of Carbon Atoms in End Capping Agent | Gardner-Holdt Viscosity of Mix | | | | | Appearance After 6 days | Wetting Properties of Films | |
|---|---|---|---|---|---|---|---|---|---|---|
| | | | Fresh Mix | 1 hr. | 4 hrs. | 8 hrs. | 24 hrs. | | Mix Aged 1 hr. | Mix Aged 8 hrs. |
| 1 | Propylene Oxide | 3 | M | H | B | I | Gel | Gel | OK | extreme crawling |
| 2 | Acrylonitrile | 3 | E | H | I | C | M | Gel | Fair | crawls |
| 3 | Butyl glycidyl ether | 7 | D | A | $A_1$ | A | H | Gel | OK | crawls |
| 4 | Phenyl glycidyl ether | 9 | C | C | $A_1$ | $A_1$ | $A_1$ | Gel | crawls | extreme crawling |
| 5 | Diacetone acrylamide | 9 | D | D | $A_1$ | A | Gel | Gel | crawls | crawls |

TABLE V-continued

| Run No. | End Capping Agent | No. of Carbon Atoms in End Capping Agent | Gardner-Holdt Viscosity of Mix | | | | | Appearance After 6 days | Wetting Properties of Films | |
|---|---|---|---|---|---|---|---|---|---|---|
| | | | Fresh Mix | 1 hr. | 4 hrs. | 8 hrs. | 24 hrs. | | Mix Aged 1 hr. | Mix Aged 8 hrs. |
| 6 | Epoxide 7 | 11–13 | C | B | A | A | A | Liquid | OK | OK |
| 7 | Nedox 1114 | 11–14 | D | D | E | G | G | Liquid | OK | OK |
| 8 | Cardura E | 12–14 | C | A | A | B | B | Liquid | OK | OK |
| 9 | Epoxide 8 | 13–15 | C | B | A | B | D | Liquid | OK | slight incompatibility* |
| 10 | Vikolox 18 | 18 | Q | T | $Z_6$ | $Z_6$ | Gel | Gel | Incompatible | Incompatible* |

*Incompatibility is manifested by visable beads which appear in the dried film and/or by the lack of gloss in the film.

EXAMPLE 6

Using the procedures of Example 1, an epoxy-amine adduct is prepared using the diglycidyl ether of Bisphenol A having an average value of n=5 and an epoxide equivalent weight of 958. The epoxide resin and diethylene triamine are reacted at a ratio of 5 moles of diethylene triamine per epoxide equivalent. After removal of the unreacted amine, the resulting epoxy-amine adduct is then reacted with the mixture of monoglycidyl ethers of 8 to 10 carbon atom alcohols, described in Example 1 Part A, at a ratio of 2 moles of monoepoxide per mole of epoxy-amine adduct in the presence of an amount of ethylene glycol monoethyl ether sufficient to bring the solids content of the mixture to 65%. The resulting monoepoxide end capped epoxy-amine adduct exhibits a nitrogen content of 3.04%, a nitrogen equivalent weight of 430, and an amine hydrogen equivalent weight of 430.

A water thinned pigmented portion is then prepared in accordance with the procedures of Example 1 Part C, using 270.0 parts of the 65% NV end capped adduct solution, 293.4 parts of rutile titanium dioxide pigment, 14.38 parts of glacial acetic acid, 2.0 parts Drew L-475 defoamer, and 335.0 parts of deionized water. The resulting pigmented portion has a solids content of 51.3%, and the degree of salting is 58%.

To 215 parts of the pigmented portion are added 21.32 parts of an 87% solution of the epoxy resin crosslinker employed in Example 1 Part B, in ethylene glycol monoethyl ether and the mixture thinned with 29.0 parts of deionized water, to achieve a solids content of 48.53%. The resulting paint composition is employed to prepare several films on glass panels using a 4 mil Bird applicator. The panels are air dried at room temperature for 22 and 40 hours. The water spot test is then performed on the films by placing a 2 ml drop of deionized water on the film surface and covering the drop with a watch glass for 1 hour. The water is then wiped off and the film dried. The panel is allowed to recover for 16 hours. The film which is air dried for 22 hours prior to water contact recovers completely after 16 hours. The 40 hour dried film showed no initial softening after the water spot test.

Several other glass panels are coated in a similar manner with a 4 wet mil Bird applicator using paint samples (derived from the present Example and Example 2) which have been aged for different periods of time as shown in Table VI. The resulting films are allowed to dry between 13 and 14 days at room temperature as shown at Table VI. The films are then spotted with a variety of stains and chemicals. The chemicals are covered with a watch glass to prevent evaporation and the stains ar left uncovered. The stains and chemicals are left in contact with the films for about 18 hours and then wiped off. The films are then observed for softening, dulling, blistering, and discoloration. The results are summarized at Table VI.

As may be seen from the data of Table VI the formulations derived from Examples 2 and 6 exhibit excellent stain and water resistance and good chemical resistance.

TABLE VI

| Example No. | Run No. | Paint Ageing Time (hrs) | Film Dry Time (days) | Coffee | Mustard | Ketchup | Water | 20% NaOH | 5% Acetic Acid | 10% Acetic Acid | Fatty Acid* | 10% HCl | Gasoline | 5% Tide | Butter | 10% $NH_3$ |
|---|---|---|---|---|---|---|---|---|---|---|---|---|---|---|---|---|
| 2 | 1 | 1 hr | 14 | NE | NE | NE | NE | NE | NE | NE | D | B-S | NE | NE | NE | NE |
| | 2 | 4 hr | 14 | NE | NE | NE | NE | NE | NE | NE | D | B-S | NE | NE | NE | S1-S |
| | 3 | 8 hr | 14 | NE | NE | NE | NE | NE | NE | NE | D | B-S | NE | NE | NE | NE |
| | 4 | 24 hr | 13 | NE | NE | NE | NE | NE | NE | NE | D | B-S | NE | NE | NE | B |
| 6 | 5 | 1 hr | 14 | NE | NE | NE | NE | NE | B-S | B-S | D | NE | NE | NE | NE | S1-S |
| | 6 | 4 hr | 14 | NE | NE | NE | NE | NE | B-S | NE | D | NE | NE | NE | NE | S1-S |
| | 7 | 8 hr | 14 | NE | NE | NE | NE | NE | S1-S | NE | D | NE | NE | NE | NE | NE |
| | 8 | 24 hr | 13 | NE | NE | NE | NE | NE | S1-B-S | NE | D | S1-S | NE | NE | NE | NE |

Rating Code:
S1 = Slightly
S = Softened
VS1 = Very Slightly
NE = No Effect
D = Dulled
B = Blistered
*Tall oil Fatty Acid.

EXAMPLE 7

This Example illustrates the effect on film properties of varying the amount of aromatic monoepoxide as a constituent of the end capping agent for a polyamine terminated epoxy resin derived from a Bisphenol A polyepoxide resin having an average value of n=0.2.

Thus, triethylene tetramine and ethylene glycol monoethyl ether are added to a 1 liter round bottom flask equipped with a heating mantle, agitator, thermometer, addition funnel, and condenser and the contents heated to 50° C. A polyepoxide resin, which is the diglycidyl ether of Bisphenol A having an average value of n=0.2, is premixed with the end capping agent which comprises a mixture of (1) o-cresol glycidyl ether (aromatic monoepoxide) and (2) a mixture of monoglycidyl ethers of straight chain aliphatic monohydric alcohols, said ethers having between 13 and 15 carbon atoms (aliphatic monoepoxide). The premix is added slowly through the addition funnel over a period of 1 to 2 hours while maintaining the pot temperature at about 50° C. Upon completion of the addition the contents of the flask are maintained at 50° C. for one hour. The contents of the flask are poured off into a quart jar and aged overnight in a hot box at 50° C. This procedure is repeated several times with the exception that the molar ratio of the aromatic to aliphatic constituents of the end capping agent are varied as shown at Table VII as are the moles and parts by weight of the reactants employed in each run. The solids content of the resulting end capped adducts is 85%. 50 parts of each end capped adduct are then salted with acetic acid to the degree and with the amount of acetic acid shown at Table VII. The salted adduct is diluted with water to bring the solids content of each end capped adduct to about 25% as shown at Table VII. To 30 parts of each salted and diluted end capped adduct is then added a mixture of the crosslinker and monoepoxide diluent. The crosslinker and diluent are present in the mixture at a weight ratio of 75:25 respectively. The crosslinker is the diglycidyl ether of Bisphenol A having an average value of n=0.2, and the diluent is the same mixture of aliphatic monoepoxides used in preparing the end capped adduct. The amount of the mixture of crosslinker and diluent added to each end capped adduct is shown at Table VII.

Each blend is then used to prepare a film on glass panels in accordance with Example 5 using a Bird applicator. The visual appearance of each film is then noted and the results shown on Table VIII.

As can be seen from the data of Table VIII, the smoothness and dry film clarity of the blend employing an adduct end capped with an end capping agent which comprises 65 mole percent aromatic monoepoxide and 35 mole percent aliphatic monoepoxide exhibit the best film properties. The film properties increasingly deteriorate as the aromatic content of the end capping agent decreases below about 60 mole percent.

TABLE VII

Preparation of End Capped Polyamine Terminated Epoxy Adduct

| Run No. | TETA (moles/parts) | n = 0.2 Diglycidyl Ether of Bisphenol A (moles/parts) | O-cresol Glycidyl Ether (moles/parts) | 13-15 Carbon Atom Aliphatic Monoglycidyl Ether (moles/parts) | EGMEE (parts) | Degree of Salting With Acetic Acid (%/parts) | Solids Content of Salted End Capped Adduct (%) | Diluent Crosslinker Mix (parts) | Solids Contents of Blend (%) |
|---|---|---|---|---|---|---|---|---|---|
| 1 | 2/146 | 1/191 | 1.3/128 | 0.7/100.1 | 99.8 | 25/4.51 | 25.83 | 11.35 | 41.21 |
| 2 | 2/146 | 1/191 | 1.15/113.3 | 0.85/121.6 | 100.9 | 25/4.46 | 25.08 | 10.89 | 40.13 |
| 3 | 2/146 | 1/191 | 1.0/98.1 | 1.0/142.3 | 101.9 | 25/4.84 | 25.02 | 11.79 | 39.55 |
| 4 | 2/146 | 1/191 | 0.85/83.8 | 1.15/164.5 | 103.3 | 25/4.34 | 24.38 | 10.35 | 37.31 |
| 5 | 2/146 | 1/191 | 0.7/69 | 1.3/185.9 | 104.5 | 25/4.31 | 23.38 | 10.23 | 37.15 |
| 6 | 2/146 | 1/191 | 1.3/128 | 1.0/143 | 107.3 | 25/4.04 | 23.74 | 9.34 | 36.38 |
| 7 | 2/146 | 1/191 | 1.0/98.5 | 1.3/185.9 | 109.7 | 25/3.95 | 23.10 | 8.89 | 35.24 |

TETA = triethylene tetramine
EGMEE = ethylene glycol monoethyl ether

TABLE VIII

| | End Capping Agent | | Film Properties | |
|---|---|---|---|---|
| Run No. | Molar Ratio Aromatic:Aliphatic | Mole % Ratio Aromatic:Aliphatic | Surface Appearance | Dry Film Clarity |
| 1 | 1.3:0.7 | 65:35 | Smooth | Good |
| 2 | 1.15:0.85 | 58.5:42.5 | V.F.W. | VSF |
| 3 | 1.0:1.0 | 50:50 | V.F.W. | VSF |
| 4 | 0.85:1.15 | 42.5:58.5 | V.F.W. | VSF |
| 5 | 0.7:1.3 | 35:65 | V.F.W. | VSF |
| 6 | 1.3:1.0 | 56.5:43.5 | F.W. | SF |
| 7 | 1.0:1.3 | 43.5:56.5 | F.W. | SF |

V.F.W. = very fine wrinkles
FW = fine wrinkles
VSF = very slight frosting
SF = slight frosting

EXAMPLE 8

This example illustrates the effect of varying the aromatic content of the end capping agent when the polyamine terminated epoxy adduct is derived from the diglycidyl ether of Bisphenol A having the average value of n=2.0.

Thus, an end capped polyamine terminated epoxy adduct is prepared in accordance with the procedures of Example 7 with the exception that the average value of n is the polyepoxide resin is 2 and has an epoxide equivalent weight of 497. The molar and weight amounts in parts of reactants employed are summarized at Table IX. 50 parts of each end capped adduct solution are then salted with acetic acid to the degree as shown at Table IX and diluted with water to a solids content of about 28% as also shown at Table IX. 30 parts of each salted end capped adduct aqueous solution are blended with the mixture of monoepoxide diluent and crosslinker in accordance with Example 7. The weight ratio of crosslinker to diluent is 75:25 and the amount of the mixture added to the salted end capped adduct is shown at Table IX.

Each blend is used to prepare cast film samples 0.5 hour after blending. The cast film samples are prepared in accordance with Example 5. The film samples are observed for surface appearance and the results summarized at Table X.

As may be seen from the data of Table X when no aromatic monoepoxide is employed in the end capping agent, the film is grainy in appearance which is indicative of incompatibility between the crosslinker and end capped adduct. Thickening at the edge is indicative of poor wetting of the glass panel and can also be caused by poor compatibility.

When 35 mole percent of the end capping agent is aromatic, the compatibility is improved so that the grainy appearance is eliminated but the film still exhibits some slight thickening at the edges. Such formulations may be employed in certain instances where film appearance is not critical. Thus, the minimum amount of aromatic monoepoxide acceptable in the end capping agent is lower when n of the polyepoxide resin is 2.0 rather than 0.2 as shown in Example 7.

The best film properties are obtained when the end capping agent contains 65 mole percent aromatic monoepoxide.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A two component resin coating system wherein when the components are mixed forms a curable coating composition which comprises:
   (I) a first component comprising
      (A) an end capped polyamine terminated polyepoxide resin adduct which is the reaction product of
         (1) a polyepoxide resin represented by the structural formula:

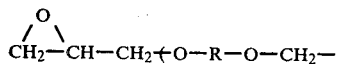
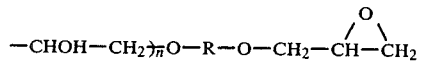

wherein R is a divalent hydrocarbon radical of a dihydric phenol and the average value of n is not greater than 5; and
         (2) a polyamine having at least two amine nitrogen atoms per molecule, at least three reactive amine hydrogen atoms per molecule and no other groups reactive with epoxide groups to form a polyamine terminated epoxy adduct; and
         (3) an end capping agent which is a monoepoxide having between about 9 and about 16 carbon atoms, one 1,2-epoxide group per molecule and no other groups reactive with amine groups; and wherein
            (a) at least 25 mole percent of the monoepoxide constituting the end capping agent is an aliphatic monoepoxide;
            (b) at least a portion of the end capping agent additionally is a crosslinker-compatibilizing-amount of an aromatic monoepoxide when the average value of n of the polyepoxide resin of I-A-1 is not greater than about 2;
            (c) about 1 mole of the polyamine of I-A-2 is reacted per epoxide equivalent of the polyepoxide resin of I-A-1; and
            (d) said end capping agent is reacted with said polyamine terminated polyepoxide resin adduct in an amount sufficient to eliminate

TABLE IX

Preparation of End Capped Polyamine Terminated Epoxy Adduct

| Run No. | TETA (moles/parts) | n = 2 Diglycidyl Ether of Eisphenol A (moles/parts) | O-cresol Glycidyl Ether (moles/parts) | 13-15 Carbon Atom Monoglycidyl Ether (moles/parts) | EGMEE (parts) | Degree of Salting (%) | Solids Content of Salted End Capped Adduct (%) | Diluent Crosslinker Mix (parts) | Solids Content of Blend (%) |
|---|---|---|---|---|---|---|---|---|---|
| 1 | 2/105.12 | 1/357.8 | 0 | 2/209.50 | 288.18 | 25 | 28.17 | 7.49 | 37.51 |
| 2 | 2/105.12 | 1/357.8 | 0 | 2/209.50 | 288.18 | 35 | 28.65 | 7.62 | 38.06 |
| 3 | 2/105.12 | 1/357.8 | 0 | 2/209.50 | 288.18 | 45 | 28.08 | 7.47 | 37.41 |
| 4 | 2/105.12 | 1/357.8 | 0.7/49.64 | 1.3/136.20 | 178.04 | 25 | 28.21 | 7.78 | 35.47 |
| 5 | 2/105.12 | 1/357.8 | 0.7/49.64 | 1.3/136.20 | 178.04 | 35 | 28.71 | 7.41 | 35.98 |
| 6 | 2/105.12 | 1/357.8 | 0.7/49.64 | 1.3/136.20 | 178.04 | 45 | 29.20 | 8.05 | 36.50 |
| 7 | 2/105.12 | 1/357.8 | 1.3/92.20 | 0.7/73.33 | 269.34 | 25 | 28.25 | 8.04 | 34.39 |
| 8 | 2/105.12 | 1/357.8 | 1.3/92.20 | 0.7/73.33 | 269.34 | 35 | 29.89 | 8.51 | 36.03 |
| 9 | 2/105.12 | 1/357.8 | 1.3/92.20 | 0.7/73.33 | 269.34 | 45 | 30.41 | 8.65 | 36.53 |

TETA = triethylene tetramine
EGMEE = ethylene glycol monoethyl ether

TABLE X

| Run No. | End Capping Agent Mole % Ratio Aromatic:Aliphatic | Film Properties Surface Appearance |
|---|---|---|
| 1 | 0:100 | P.T./G. |
| 2 | 0:100 | P.T./G. |
| 3 | 0:100 | P.T./SL.G |
| 4 | 35:65 | SL.T/SL.G. |
| 5 | 35:65 | SL.T |
| 6 | 35:65 | SL.T |
| 7 | 65:35 | S |
| 8 | 65:35 | S |
| 9 | 65:35 | S |

P.T. = pronounced thickness at the edge
SL.T. = slight thickness at the edge
S = smooth
G = grainy appearance
Sl.G. = slightly grainy appearance the presence of primary amines on said adduct and to achieve at least a molar ratio of 2:1 respectively of end capping agent to adduct and not greater than the amount which would theoretically eventually lead to a reduction in the amine hydrogen functionality per mole of said end capped polyamine terminated epoxy adduct to below about 3 by reaction with monoepoxide; and (II) a second component comprising
(A) a polyepoxide resin crosslinker which is a glycidyl polyether of a polyhydric phenol having an epoxide equivalent weight of not greater than about 600, the amount of said crosslinker in the second component being sufficient to achieve an epoxy to reactive end capped adduct amine hydrogen equivalent weight ratio of from about 0.5:1 to about 1.5:1;

and wherein said first and second components are suitable for mixing when the amine groups of the end capped polyamine terminated epoxy adduct are salted to a degree of from about 15 to about 85% by reaction with a volatile acid and the first component is diluted with water in an amount sufficient to achieve a solids content in the first component of from about 15 to about 45%, by weight, based on the weight of the end capped polyamine terminated epoxy adduct and water.

2. The resin coating system of claim 1 wherein said first component contains in admixture with said end capped polyamine terminated polyepoxide resin adduct at least one non-reactive organic aliphatic hydroxyl containing co-solvent having a solubility parameter polar component between about 2.8 to about 4.5 $(cal/cm^3)^{\frac{1}{2}}$ present in an amount not greater than about 45%, by weight based on the weight of said end capped polyamine terminated polyepoxide resin adduct and co-solvent.

3. The resin coating system of claim 1 wherein said second component contains a diluent in admixture with the polyepoxide resin crosslinker selected from at least one member of the group consisting of
(1) at least one non-reactive organic aliphatic hydroxyl containing co-solvent having a solubility parameter polar component between 2.8 and 4.5 $(cal/cm^3)^{\frac{1}{2}}$ which is present in an amount not greater than about 40%, by weight, based on the weight of diluent and crosslinker;
(2) at least one monoepoxide having
(a) one 1,2-epoxide group and no other groups reactive with amine groups;
(b) between about 9 and about 16 carbon atoms; and
(c) the capability of dissolving the polyepoxide resin crosslinker therein at room temperature, said monoepoxide being present in an amount not greater than about 40%, by weight, based on the weight of crosslinker and diluent;
(3) at least one aliphaic glycidyl polyether, having from about 10 to about 50 carbon atoms, said glycidyl polyether being present in an amount not greater than about 40% by weight based on the weight of the crosslinker and diluent; and
(4) a mixture of water and nonionic surfactant capable of dispersing the polyepoxide resin crosslinker, said aqueous mixture being present in the second component in an amount not greater than about 75% by weight, based on the weight of the diluent and crosslinker and said surfactant being present in the second component in an amount of from about 3 to about 12%, by weight, based on the weight of diluent and crosslinker.

4. The coating system of claim 1 wherein R of the structural formula is a divalent radical derived from p,p'-dihydroxydiphenyl propane; the polyamine is an alkylene polyamine having the formula:

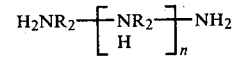

wherein n is an integer from 0 to 4, and $R_2$ is an alkylene group containing 2 to 6 carbon atoms; the end capping agent is selected from the group consisting of monoglycidyl ethers of straight chain monohydric alcohols, said ethers having 11 to 15 carbon atoms, terminal olefin oxides having one 1,2-epoxy group and 11 to 14 carbon atoms, monoglycidyl esters of saturated tertiary monocarboxylic acids, said esters having 12 to 14 carbon atoms, and mixtures thereof and the epoxy to reactive adduct amine hydrogen equivalent weight ratio is from about 0.8:1 to about 1.1:1.

5. The coating system of claim 2 wherein the co-solvent diluent is selected from at least one member of the group consisting of t-butanol; n-propanol; n-butanol, the mono ethyl, propyl and butyl ethers of ethylene glycol, the mono methyl, propyl, and butyl ethers of propylene glycol, the mono ethyl and butyl ethers of diethylene glycol and the mono methyl ether of dipropylene glycol.

6. The coating system of claim 3 wherein the monoepoxide diluent is selected from at least one member of the group consisting of monoepoxidized terminally unsaturated straight chain hydrocarbons, monoglycidyl ethers of aliphatic alcohols, monoglycidyl ethers of aromatic and alkyl substituted aromatic alcohols and monoglycidyl esters of saturated tertiary monocarboxylic acids; and (3) the non-ionic surfactant employed in the water-surfactant mixture is the reaction product of polyethylene glycol having a weight average molecular weight of about 4,000 to about 9,000, and the diglycidyl ether of p,p'-dihydroxy-diphenyl propane having an epoxide equivalent weight of from about 180 to about 700, at a molar ratio of from about 3:1 to about 5:4.

7. The coating system of claim 3 wherein in the first component R in the structural formula is a divalent radical derived from p,p'-dihydroxy-diphenyl propane and the average value of n is about 2.0, the polyamine is triethylene tetramine, the aliphatic monoepoxide portion of the end capping agent is a mixture of monoglycidyl ethers of straight chain aliphatic monohydric alcohols, said ethers having between 13 and 15 carbon atoms, and the aromatic monoepoxide portion of the end capping agent is o-cresol glycidyl ether which constitutes at least 40 mole percent of the end capping agent, and wherein in the second component the polyepoxide resin crosslinker is the diglycidyl polyether of p,p'-dihydroxy-diphenyl propane having an epoxide equivalent weight of from about 180 to about 200, and the diluent is a mixture of monoglycidyl ethers of straight chain aliphatic monohydric alcohols said ethers having between about 12 and 15 carbon atoms wherein the diluent is present in said second component in an amount which can vary from about 10 to about 30% by weight based on the weight of diluent and crosslinker.

8. The coating system of claim 7 wherein in the first component the average value of n in the structural formula is about 0.2, and at least 60 mole %, of the end capping agent is o-cresol glycidyl ether.

9. The coating system of claim 3 wherein in the first component R in the structural formula is a divalent radical derived from p,p'-dihydroxy-diphenyl propane and the average value of n is about 5, the polyamine is diethylene triamine, the end capping agent is a mixture of the monoglycidyl ethers of straight chain aliphatic alcohols, said ethers having between about 11 and about 13 carbon atoms, and wherein in the second component the polyepoxide resin crosslinker is the diglycidyl ether of p,p'-dihydroxy-diphenyl propane having an epoxide equivalent weight of about 180 to about 200, and the diluent is ethylene glycol monoethyl ether which is present in the second component in an amount which can vary from about 10 to about 30%, by weight, based on the weight of crosslinker and diluent.

10. The coating system of claim 1 wherein the amine groups of the end capped polyamine terminated epoxy adduct of the first component are reacted with a sufficient amount of volatile acid to achieve a degree of salting of from about 15 to about 85%, and the first component additionally contains water in an amount sufficient to bring the solids content thereof to from about 15 to about 45%, by weight, based on the weight of the first component.

11. The coating system of claim 10 wherein the volatile acid is acetic acid, and the degree of salting of the end capped polyamine terminated epoxy adduct is from about 20 to about 65%.

12. The coating system of claim 1 wherein pigment is present in at least one of the components.

13. The coating system of claim 1 wherein the two components are mixed after reacting with the volatile acid to form a curable coating composition and diluted with sufficient water to bring the solids content of the mixture to from about 15 to about 60%, by weight, based on the weight of the total composition.

* * * * *

UNITED STATES PATENT OFFICE
CERTIFICATE OF CORRECTION

PATENT NO. : 4,246,148

DATED : January 20, 1981

INVENTOR(S) : DAVID A. SHIMP, DARRELL D. HICKS, RICHARD B. GRAVER

It is certified that error appears in the above-identified patent and that said Letters Patent are hereby corrected as shown below:

Cover Page, Under "References Cited", delete "Aelanger" and insert --Belanger--
Column 5, Line 57, delete "4,111,900" and insert --4,116,900--;
 Line 59, insert --is removed-- following ,if any,
Column 8, Line 5, delete "mnoglycidyl" and insert --monoglycidyl--
Column 10, Line 55, delete "identify" and insert --identity--
Column 12, Line 5, delete "not reactive" and insert --non reactive--
 Line 15, delete "
$$p = \sqrt{\frac{12108(\mathcal{E} - 1)}{V_m^2 \; 2 + m_D^2}} \; (n^2_D + 2)n^3 \; \frac{cal}{cm^3}$$
"
 insert--
$$p = \sqrt{\frac{12108}{V_m^2} \; \frac{\mathcal{E} - 1}{2_\mathcal{E} + n_D^2}} \; (n_D^2 + 2)u^2 \left[\frac{cal}{cm^3}\right]$$
 --
Column 13, Line 24, delete "know" and insert --known--
Column 15, Line 48, delete "50 and 55" and insert --50 to 55--
Column 16, Line 39, delete "to Part B" and insert --of Part B--
Column 19, Line 65, delete "Voscosity" and insert --Viscosity--
Column 22, Table IV, 5th Column, delete "ethyl ethor" and insert --ethyl ether--
 Table IV, For "Acrylonitrile" under "Blend Solids Content", delete "34.03" and insert --34.08--
Column 24, Line 34, delete "ar" and insert --are--
Column 26, Line 59, delete "n is" and insert --n in--

Signed and Sealed this

Fourteenth Day of April 1981

[SEAL]

Attest:

RENE D. TEGTMEYER

Attesting Officer   Acting Commissioner of Patents and Trademarks